Figure 1:
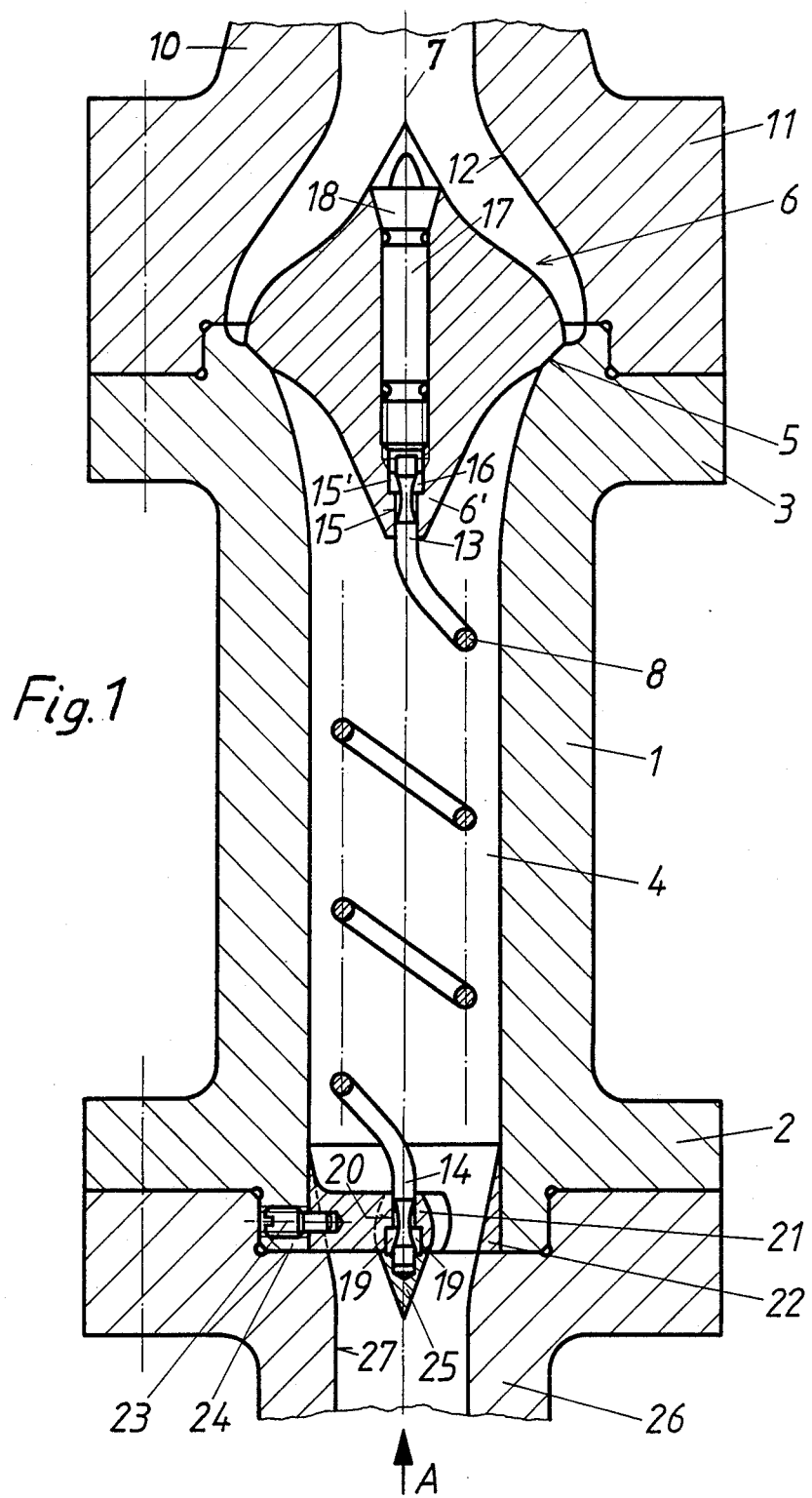

United States Patent [19]
Steiger

[11] Patent Number: 4,827,975
[45] Date of Patent: May 9, 1989

[54] VALVE

[75] Inventor: Anton Steiger, Illnau, Switzerland

[73] Assignee: Sulzer Brothers Limited, Winterthur, Switzerland

[21] Appl. No.: 160,853

[22] Filed: Feb. 26, 1988

[30] Foreign Application Priority Data

Mar. 11, 1987 [CH] Switzerland ............... 00903/87

[51] Int. Cl.⁴ ............................................ F16K 15/00
[52] U.S. Cl. .................................. 137/537; 137/541; 251/337; 267/74
[58] Field of Search ............... 137/537, 541; 251/337; 267/74

[56] References Cited

U.S. PATENT DOCUMENTS

| 2,330,091 | 9/1943 | Townhill | 251/337 |
| 2,623,540 | 12/1952 | Palermo | 137/537 X |
| 2,756,106 | 7/1956 | Schenk | 137/537 X |
| 3,289,686 | 12/1966 | Tyer | 137/537 X |
| 3,817,507 | 6/1974 | Derman | 267/74 |

FOREIGN PATENT DOCUMENTS

| 911924 | 5/1954 | Fed. Rep. of Germany | 137/537 |
| 1069424 | 11/1959 | Fed. Rep. of Germany | 137/541 |
| 2454937 | 4/1976 | Fed. Rep. of Germany | 137/537 |

Primary Examiner—Robert G. Nilson
Attorney, Agent, or Firm—Kenyon & Kenyon

[57] ABSTRACT

The check valve employs a helical tension spring which is connected at one end to the valve lid on the axis of the valve lid and at the opposite end via a ring on the axis of the valve body. Wedge-shaped elements are provided in the lid to engage with an annular groove in the spring and similar wedge-shaped elements are provided in a hub of the ring to engage with the second end of the spring. A rubber member may also be inserted within the windings of the spring to reduce the flow cross section through the valve body.

13 Claims, 2 Drawing Sheets

VALVE

This invention relates to a valve. More particularly, this invention relates to a check valve for shutting off liquids containing fine particles of solids.

Heretofore, various types of check valves have been known for shutting off the flow of liquids, particularly liquids containing fine particles of solids. For example, Swiss Patent 653,112 describes a check valve having a valve body in which a valve lid of symmetrical construction is disposed in order to control a flow of liquid from the valve body. As described, three tension springs are wound one in another in order to bias the lid into sealing relation with the valve body. In addition, the springs extend with a clearance around a stem which is rigidly connected to the lid with the spring ends near the lid connected to the lid on the winding diameter, for example, by soldering. The opposite ends of the springs are bent outwardly for securement to the valve body.

While the above described valve is useful in applications where there are no transverse vibrations, i.e. cross oscillations, such is not the case if external influences do not preclude the possibility of cross-oscillations. For example, when the valve is used in a reciprocating internal combustion engine, cross-oscillations may occur due to vibrations. Such cross-oscillations may lead to excessive wear between the springs and the stem which is connected to the lid. Further, the tension springs must be manufactured in an identical fashion and the securement and assembly of these springs are relatively complicated.

Accordingly, it is an object of the invention to provide an improved check valve which can be simply produced and assembled.

It is another object of the invention to substantially reduce wear in a check valve.

It is another object of the invention to provide a check valve having a spring biased lid of relatively simple construction.

Briefly, the invention provides a valve comprising a valve body, a valve lid and a helical tension spring. The valve body is constructed to define a flow passage, for example for a liquid flow containing fine solid particles and has a sealing seat at one end of the passage. The valve lid is constructed in symmetrical fashion about an axis of rotation and is disposed at one end of the valve body for sealingly seating on the sealing seat in order to close the flow passage. The helical tension spring is disposed in the flow passage of the valve body and has one end secured to the valve lid on an axis coaxial of the valve lid and a second end secured to the valve body on the axis in order to bias the lid into sealing engagement with the sealing seat.

The conventional stem which has heretofore been connected to the valve lid is eliminated. Thus, cross-vibrations do not cause any wear between the turns of the spring and any stem extending from the lid.

The point at which the spring force acts on the lid, as considered on the direction of flow of the liquid medium, is a considerable distance from the seat in the valve body. Hence, the arrangement of the lid is inherently stable.

Since only a single tension spring is used, the spring need not be accurately manufactured to be identical to another spring as is the case in the previously known check valves. Accordingly, manufacturing tolerances can be higher than previously used. Further, because of the central securement of the ends of the spring to the lid and body, these spring ends need only accommodate tension so that the stressing of the spring is reduced.

Figure 2:
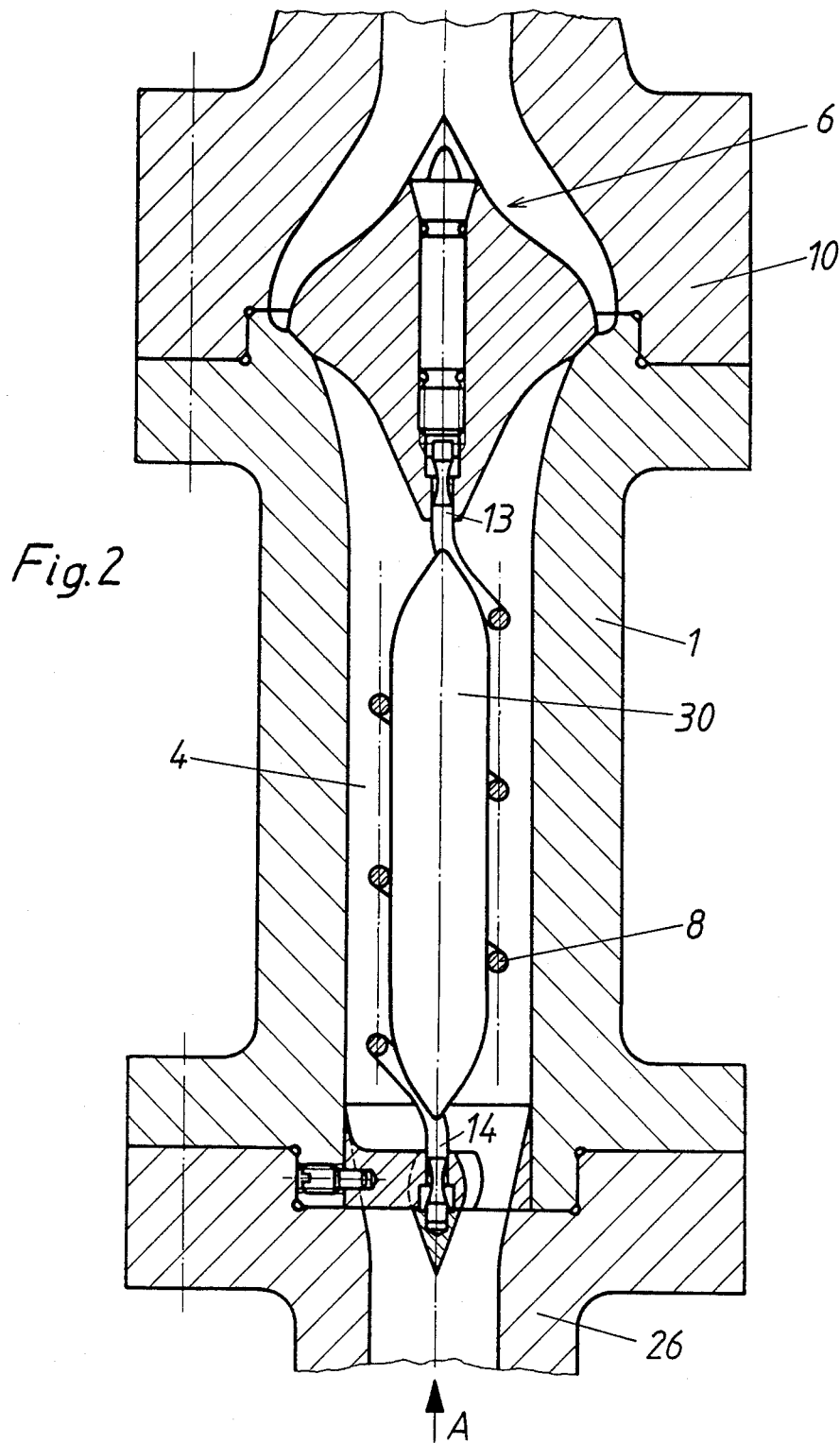

These and other objects and advantages of the invention will become more apparent from the following detailed description taken in conjunction with the accompanying drawings wherein:

FIG. 1 illustrates a longitudinal cross-sectional view through a check valve constructed in accordance with the invention; and FIG. 2 illustrates a longitudinal sectional view through a modified check valve constructed in accordance with the invention.

Referring to FIG. 1, the check valve has a tubular valve body 1 having connecting flanges 2, 3 at opposite ends. As shown, the valve body 1 is of cylindrical shape to define a flow passage 4. As indicated, the flow passage 4 widens at the upper end of the valve body 1, as viewed, and merges into a conical sealing seat 5 at the end.

The check valve also has a symmetrical valve lid 6 disposed at one end of the body 1 for sealingly seating on the seat 5 in order to close the flow passage 4. As indicated, the lid 6 has an axis 7 which is coaxial with the axis of the flow passage 4.

A helical tension spring 8, for example, made of a wire of circular cross-section, is disposed in the flow passage 4 and is secured at opposite ends to the valve lid 6 and the valve body 1 in order to bias the lid 6 into sealing engagement with the seat 5.

As indicated, the top part of the lid 6 is substantially onion-shaped and has a sealing surface below the major diameter which is adapted to the seat 5. Below this sealing surface, the lid 6 merges by way of a concave part into a conical part 6'. A casing part 10 is also disposed around the lid 6 above the sealing surface. This casing part 10 has a flange 11 which is secured to the flange 3 of the valve body 1 by means of screws (not shown). The casing part 10 has an interior contour 12 which extends around the valve lid 7 of onion-shape. The maximum diameter of this contour 12 corresponds to the inside diameter in the body 1 above the seat 5. The inside contour 12 also merges at the top end into a cylindrical bore which merges into a line (not shown).

As illustrated, the tension spring 8 has one end secured to the lid 6 on an axis coaxial of the lid 6 and a second end secured to the body 1 on the same axis. To this end, a means is provided for releasably securing each end of the spring 8 to the lid 6 and the body 1, respectively.

The means for securing the spring 8 to the lid 6 includes a pair of wedge-shaped elements 16 which cooperate to form ring and which are disposed about the end 13 of the spring 8 within the lid 6 in order to receive the spring 8 in wedging relation therebetween. To this end, tee end 13 of the spring 8 is coaxial of the axis 7 of the lid 6 and has an annular groove which is formed, for example, by grinding, in order to receive the wedge-shaped elements 16. As indicated, the groove tapers from opposite ends toward the middle in wedge-like manner.

The lid 6 is provided with a central bore 15 of a diameter corresponding substantially to the diameter of the wire used for the spring 8. In addition, a stepped bore 15' is also provided downstream of the central bore 15 in order to receive the wedge-shaped elements 16. The elements 16 are disposed to engage against the top part of the groove in the spring 8 so as to secure the spring end 13 against being pulled out of the lid A lock screw 17 is disposed in an extension of the stepped bore 15' and has a conical seat 18 at the upper end, as viewed. The lock screw 17 serves both as a screw fastening and as a sealing means between the top and bottom of the lid 6. Following the conical seat 18, the screw 17 has a contoured head which is an upwards continuation of the onion-shaped outside contour of the lid 6. When in place, the lock screw 17 strengthens the connection of the spring 8 to the lid 6.

The means for securing the spring 8 to the valve body 1 includes a ring 22 which is disposed at the lower end of the valve body 1 in order to register with the bottom end face of the body 1. A plurality of grub screws 23, only one of which is shown in FIG. 1, retains the ring 22 in this position. As indicated, the grub screws 23 are threaded into a downwardly projecting shoulder 24 of the valve body 1 and each extends by way of a pin into the ring 22.

The ring 22 has a centrally disposed hub 21 for receiving the lower end 14 of the spring 8 as well as a pair of wedge-shaped elements 19 which are disposed about the spring end 14 within a stepped bore 20 of the hub 21. As above, the spring end 14 is provided with an annular groove of tapered shape for receiving the elements 19 in wedging relation. A plurality of arms extend radially from the hub 21 to the outer perimeter of the ring 22.

As illustrated, the end 14 of the spring 8 which projects downwardly from the hub 21 is provided with a pressed-on conical cap 25 in order to produce advantageous flow conditions for a medium flowing in the direction indicated by the arrow A.

Of note, the wedge-shaped elements 16,19 are known elements which are used in the inlet and exhaust valves of internal combustion engines and need not be further described. As illustrated, a line 26 is connected to the lower flange 2 of the valve body 1 by screws (not shown). This line 26 has a cylindrical bore 27 which widens at the top, as viewed, and merges smoothly into a conical inside contour of the ring 22.

In order to assemble a check valve, the lid 6 with the spring 8 and ring 22 suspended therefrom are introduced downwardly into the valve body 1 until the sealing surface of the lid 6 meets the seat 5 on the body 1. The ring 22 then has a position which is located inwardly of the valve body 1 relative to that shown in FIG. 1. A suitable tool (not shown) is then used to tension the spring 8 by the tool engaging the radial arms of the ring 22 to draw the ring 22 downwardly until the bottom end face is flush with the end face of the shoulder 24. Thereafter, the grub screws 23 are aligned and threaded into the ring 22 to hold the ring 22 in place. The tool is then removed and the body 1 can be connected to the line 26 and casing part 10.

The check valve is particularly suitable for shutting off liquids containing fine particles of solids, i.e. suspensions or slurries. Slurries may be used, for example, as fuel in diesel engines and may consist of water or oil and carbon particles having a size of from 5 to 20 $\mu$m. The check valve has a satisfactory flow behavior and the centrally mounted tension spring makes the valve inherently stable. Further, the check valve does not tend to jam or lock the lid 6 since no guiding surfaces are present which can slide on one another. When the lid 6 opens in the direction indicated by the arrow A under the pressure of the liquid passing therethrough, the lid 6 disengages from the seat 5 without the top onion-shaped part engaging in the valve casing 10. The spring 8 stretches in the open movement, the limit of travel of the lid 6 being determined solely by the equilibrium of forces between the flow force and the maximum force of the spring 8. In other words, the movement of the lid 6 depends primarily upon the spring characteristic.

Referring to FIG. 2 wherein like reference characters indicate like parts above, the cylindrical hollow interior within the turns of the spring 8 may be filled by a rubber member 30 or the like, which has a pointed tip at each end and which is adapted in diameter and length to the interior of the spring 8. The advantage provided by the member 30 is that the inflow cross-section of the valve body 1 is reduced considerably. This is a very desirable feature when the through flowing medium is a carbon slurry. In this case, the flow velocity of the slurry or suspension is considerable. Another advantage is that the sensitivity of the tension spring 8 to transverse oscillations is lessened.

In order to introduce the rubber member 30 into the interior of the spring 8 from outside the body 1, the spring is stretched far enough to provide a large enough gap at one end of the spring 8 and the adjacent first turn for the resilient rubber member 30 to be introduced. When the rubber member 30 is in the required position, the spring 8 is released. However, instead of returning to the original length, the spring 8 returns to a length below the required spring biasing. The stretch length is therefore reduced in the fitting of the tension spring.

The invention thus provides a check valve of relatively simple construction and one which is inherently stable. Further, the invention eliminates the need for a stem on a valve lid and consequent wear of such a stem by the tensioning spring.

What is claimed is:
1. A valve comprising
 a valve body defining a flow passage and a sealing seat at one end of said passage;
 a symmetrical valve lid disposed at one end of said body for sealingly seating on said seat to close said flow passage and having a central bore;
 a helical tension spring disposed in said flow passage, said spring having one end received in said bore of said valve lid on an axis coaxial of said valve lid, said one end of said spring having an annular groove received in said bore, and a second end secured to said valve body on said axis to bias said lid into sealing engagement with said seat; and
 at least one element of wedge-shape within said bore and said groove to secure said one end to said spring in said lid.

2. A valve as set forth in claim 1 which comprises a pair of said elements in aid bore and said groove, said elements defining a ring.

3. A valve as set forth in claim 1 which further comprises a ring mounted coaxially in said valve body at one end of said flow passage, said ring having a central hub and a plurality of arms extending radially from said hub and wherein said second end of said spring is secured to said hub.

4. A valve is set forth in claim 3 wherein said hub includes a central bore receiving said second end of said spring, and said second end of said spring has an annular groove received in said bore and which further comprises at least one element of wedge-shape within said bore and said groove to secure said second end of said spring in said hub.

5. A valve as set forth in claim 1 which further comprises a rubber member within said spring, said member having a pointed tip at each end thereof.

6. A valve comprising
   a valve body having a flow passage and a sealing seat at one end of said passage;
   a valve lid at one end of said body for sealingly seating on said seat to close said flow passage; and
   a helical tension spring within said flow passage having one end coaxial of an axis of said lid and secured coaxially to said valve lid and a second coaxially disposed end secured to said body on said axis to bias said lid into sealing engagement with said seat.

7. A valve as set forth in claim 6 which further comprises first means for releasably securing said one end of said spring to said lid and second means for releasably securing said second end of said spring to said body.

8. A valve as set forth in claim 7 wherein said first means includes a pair of wedge-shaped elements disposed about said spring within said lid and receiving said spring in wedging relation therebetween.

9. A valve as set forth in claim 8 wherein said one end of said spring has an annular groove receiving said elements.

10. A valve as set forth in claim 7 wherein said second means includes a ring at one end of said body having a centrally disposed hub receiving said second end of said spring and a pair of wedge-shaped elements disposed about said spring within said hub and receiving said spring in wedging relation therebetween.

11. A valve as set forth in claim 10 wherein said second end of said spring has an annular groove receiving said elements.

12. A valve as set forth in claim 6 wherein said body is of cylindrical shape.

13. A valve comprising
   a valve body defining a flow passage and a sealing seat at one end of said passage;
   a symmetrical valve lid disposed at one end of said body for sealingly seating on said seat to close said flow passage; and
   a helical tension spring disposed in said flow passage, said spring having one end coaxial of an axis of said valve lid and secured coaxially to said valve lid and a second coaxially disposed and end secured to said valve body on said axis to bias said lid into sealing engagement with said seat.

* * * * *

UNITED STATES PATENT AND TRADEMARK OFFICE
CERTIFICATE OF CORRECTION

PATENT NO. : 4,827,975
DATED : May 9, 1989
INVENTOR(S) : ANTON STEIGER

It is certified that error appears in the above-identified patent and that said Letters Patent is hereby corrected as shown below:

Column 2, line 58 "tee" should be --the--

Column 3, line 2 "lid" should be --lid 6.--

Column 4, line 54 "aid" should be --said--

Column 6, line 24 "disposed and end" should be --disposed end--

Signed and Sealed this

Twentieth Day of February, 1990

Attest:

JEFFREY M. SAMUELS

Attesting Officer     Acting Commissioner of Patents and Trademarks